United States Patent
Gorobinskiy et al.

(10) Patent No.: US 8,173,309 B2
(45) Date of Patent: May 8, 2012

(54) REFORMER FOR FUEL CELL, AND FUEL CELL SYSTEM COMPRISING THE SAME

(75) Inventors: Leonid Gorobinskiy, Suwon-si (KR); Ju-Yong Kim, Suwon-si (KR); Man-Seok Han, Suwon-si (KR); Yong-Kul Lee, Suwon-si (KR); Chan-Ho Lee, Suwon-si (KR); Jin-Goo Ahn, Suwon-si (KR); Jin-Kwang Kim, Suwon-si (KR); Sung-Chul Lee, Suwon-si (KR); Kie-Hyun Nam, Suwon-si (KR); Noboru Sato, Suwon-si (KR); Alexey Alexandrovichserov, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1119 days.

(21) Appl. No.: 12/068,858

(22) Filed: Feb. 12, 2008

(65) Prior Publication Data

US 2008/0206613 A1   Aug. 28, 2008

(30) Foreign Application Priority Data

Feb. 12, 2007 (KR) .................. 10-2007-0014417
Jul. 6, 2007 (KR) .................. 10-2007-0068111

(51) Int. Cl.
*H01M 8/06* (2006.01)
(52) U.S. Cl. .............. 429/423; 429/433; 429/443
(58) Field of Classification Search .................. 429/423, 429/433, 443
See application file for complete search history.

(56) References Cited

U.S. PATENT DOCUMENTS

| | | | |
|---|---|---|---|
| 5,139,994 | A | 8/1992 | Chattha et al. |
| 5,345,011 | A | 9/1994 | Durante et al. |
| 6,086,835 | A | 7/2000 | Grigorova et al. |
| 6,187,709 | B1 | 2/2001 | McCabe |
| 6,793,698 | B1 | 9/2004 | Sanger et al. |
| 7,122,492 | B2 | 10/2006 | Ou et al. |
| 7,842,109 | B2 | 11/2010 | Kong et al. |
| 2002/0122755 | A1 | 9/2002 | Kurachi |

(Continued)

FOREIGN PATENT DOCUMENTS

EP   1818096 A1   8/2007

(Continued)

OTHER PUBLICATIONS

A. Törncrona et al. "Low temperature catalytic activity of cobalt oxide and ceria promoted Pt and Pd:—influence of pretreatment and gas composition", Applied Catalysis B: Environmental 14 (1997) 131-146.

(Continued)

*Primary Examiner* — Jane Rhee
(74) *Attorney, Agent, or Firm* — Robert E. Bushnell, Esq.

(57) ABSTRACT

A reformer for a fuel cell system includes a heating source for generating heat by a reaction of a fuel and an oxidant using an oxidizing catalyst, and a reforming reaction part for generating hydrogen by a reforming catalyst reaction. The oxidizing catalyst includes a solid acid, including a strong acid ion and an inorganic oxide, and a platinum-based metal. The reformer for a fuel cell system can start a fuel oxidation catalyst reaction at a low temperature with the heating source having a simplified structure.

9 Claims, 7 Drawing Sheets

U.S. PATENT DOCUMENTS

| | | | |
|---|---|---|---|
| 2004/0035055 A1* | 2/2004 | Zhu et al. | 48/127.9 |
| 2005/0191532 A1 | 9/2005 | Kim et al. | |
| 2005/0208350 A1 | 9/2005 | Isozaki et al. | |
| 2007/0020161 A1 | 1/2007 | Cho et al. | |

FOREIGN PATENT DOCUMENTS

| | | |
|---|---|---|
| JP | 2003334448 A | 11/2003 |
| JP | 2006302899 A | 11/2006 |
| KR | 10-2003-0080247 | 10/2003 |
| KR | 2005-0087246 A | 8/2005 |
| KR | 2006-0103631 A | 10/2006 |
| WO | 9718892 A1 | 5/1997 |

OTHER PUBLICATIONS

Extended European Search Report dated Feb. 2, 2009 in Applicant's corresponding European Application No. 08101511.7.

European Office Action issued by EPO, dated Mar. 1, 2011, corresponding to European Patent Application No. 08 101 511.7-1270.

Japanese Office Action issued by Japanese Patent Office on Jul. 5, 2011, corresponding to Japanese Patent Application No. 2008-031041 and Request for Entry of the Accompanying Office Action attached herewith.

* cited by examiner

US 8,173,309 B2

REFORMER FOR FUEL CELL, AND FUEL CELL SYSTEM COMPRISING THE SAME

CROSS-REFERENCES TO RELATED APPLICATIONS AND CLAIM OF PRIORITY

This application claims priority to and the benefit of Korean Patent Application No. 10-2007-0014417 filed in the Korean Intellectual Property Office on Feb. 12, 2007, and Korean Patent Application No. 10-2007-0068111 filed in the Korean Intellectual Property Office on Jul. 6, 2007 the entire contents of which are incorporated herein by reference.

BACKGROUND OF THE INVENTION (a) Field of the Invention

The present invention relates to a reformer for a fuel cell system and a fuel cell system including the same.

(b) Description of the Related Art

A fuel cell is a power generation system for producing electrical energy using a hydrocarbon-based fuel.

Representative exemplary fuel cells include a polymer electrolyte membrane fuel cell (PEMFC) and a direct oxidation fuel cell (DOFC).

The polymer electrolyte membrane fuel cell (PEMFC) has been recently developed. The PEMFC has power characteristics that are superior to those of conventional fuel cells, as well as a lower operating temperature and faster start and response characteristics. Because of this, the PEMFC can be applied to a wide range of applications such as for portable electrical power sources for automobiles, distributed power sources for houses and public buildings, and small electrical power sources for electronic devices.

Such a polymer electrolyte membrane fuel cell system is composed of a stack for a fuel cell body (hereinafter, for convenience referred to as a "stack"), a reformer that reforms the fuel to generate the hydrogen gas and supplies the hydrogen gas to the stack, and an oxidant supplier for supplying an oxidant gas to the stack. The stack generates electrical energy through an electrochemical reaction of a reformed gas supplied from the reformer and an oxidant gas supplied from the oxidant supplier.

The reformer includes a heating source for generating heat through a catalytic oxidizing reaction of the fuel, and a reforming reaction part for generating a reformed gas from the fuel through a reforming catalyst reaction of the fuel by the heat. In a conventional reformer, an oxidizing catalyst is required to be preheated at high temperature since oxidization of the fuel gas by the oxidizing catalyst occurs at high temperature in a heating source of the reformer. Therefore, high heat efficiency is required in a fuel cell system.

SUMMARY OF THE INVENTION

The present invention provides an improved reformer and an improved fuel cell system including the reformer.

One embodiment of the present invention provides a reformer for a fuel cell system that can start a fuel oxidation catalyst reaction and has a simplified structure.

Another embodiment of the present invention provides a fuel cell system including the reformer.

According to one embodiment of the present invention, provided is a reformer for a fuel cell system that includes a heating source for generating heat by a reaction of a fuel and an oxidant using an oxidizing catalyst; and a reforming reaction part for generating hydrogen by a reforming catalyst reaction. The oxidizing catalyst includes a solid acid which includes a strong acid ion and an inorganic oxide, and a platinum-based metal.

The platinum-based metal may include at least one selected from the group consisting of Pt, Pd, Ru, Rh, and combinations thereof. The inorganic oxide includes an oxide of an element selected from the group consisting of Zr, Al, Ti, Si, Mg, Zn, and combinations thereof.

The strong acid ion may include at least one selected from the group consisting of a sulfate ion, a phosphate ion, and combinations thereof.

The platinum-based metal may be supported on the solid acid.

The oxidizing catalyst includes more than 0.5 parts by weight and less than or equal to 50 parts by weight of the platinum-based metal based on 100 parts by weight of the oxidizing catalyst. According to one embodiment, the oxidizing catalyst includes 1 to 5 parts by weight of the platinum-based metal based on 100 parts by weight of the oxidizing catalyst. The oxidizing catalyst includes 10 to 70 parts by weight of the solid acid based on 100 parts by weight of the oxidizing catalyst. According to one embodiment, the oxidizing catalyst includes 20 to 60 parts by weight of the solid acid based on 100 parts by weight of the oxidizing catalyst.

The oxidizing catalyst may further include a carrier supporting the platinum-based metal and the solid acid. The carrier may be selected from the group consisting of $Al_2O_3$, $TiO_2$, $SiO_2$, $ZrO_2$, MgO, and combinations thereof. According to one embodiment, $Al_2O_3$ may be appropriate.

When the oxidizing catalyst further includes the carrier, the oxidizing catalyst includes less than 89.5 parts by weight of the carrier based on 100 parts by weight of the oxidizing catalyst. According to one embodiment, the oxidizing catalyst includes 35 to 80 parts by weight of the carrier based on 100 parts by weight of the oxidizing catalyst.

The oxidizing reaction of the fuel by the oxidizing catalyst starts at a temperature of more than or equal to 90° C.

In the reformer according to another embodiment of the present invention, the heating source includes a first reacting region that includes a platinum-based catalyst including a solid acid which includes a strong acid ion and an inorganic oxide, and a platinum-based metal; and a second reacting region including a non-platinum-based catalyst.

The first and second reacting regions may be sequentially disposed.

The fuel and oxidant may be sequentially supplied to the first reacting region and then to the second reacting region.

The platinum-based catalyst and non-platinum-based catalyst may be included in a volume ratio of 1:1 to 1:5.

The platinum-based metal may be selected from the group consisting of Pt, Pd, Ru, Rh, and combinations thereof.

The inorganic oxide may include an oxide of an element selected from the group consisting of Zr, Al, Ti, Si, Mg, Zn, and combinations thereof.

The strong acid ion may include at least one selected from the group consisting of a sulfate ion, a phosphate ion, and combinations thereof.

The platinum-based metal may be supported on the solid acid.

The platinum-based catalyst may include more than 0.5 parts by weight and less than or equal to 50 parts by weight of the platinum-based metal based on 100 parts by weight of the oxidizing catalyst, and 10 to 70 parts by weight of the solid acid based on 100 parts by weight of the platinum-based catalyst.

The platinum-based catalyst may further include a carrier supporting the platinum-based metal and solid acid.

The carrier may be selected from the group consisting of $Al_2O_3$, $TiO_2$, $SiO_2$, $ZrO_2$, MgO, and combinations thereof.

The carrier may be included in an amount of less than 89.5 parts by weight based on 100 parts by weight of the platinum-based catalyst.

The non-platinum-based catalyst may include a metal oxide including $CeO_2$, MO (wherein M is a transition element), and CuO.

The M may be selected from the group consisting of Ni, Co, Fe, and combinations thereof.

The non-platinum-based catalyst may include 10 to 30 parts by weight of $CeO_2$, 0.1 to 5 parts by weight of MO, and 1 to 10 parts by weight of CuO.

The non-platinum-based catalyst may further include $ZrO_2$.

Herein, the non-platinum-based catalyst may include 5 to 20 parts by weight of $ZrO_2$, 5 to 20 parts by weight of $CeO_2$, 0.1 to 5 parts by weight of MO, and 1 to 10 parts by weight of CuO.

The non-platinum-based catalyst may be supported on a carrier selected from the group consisting of $Al_2O_3$, $TiO_2$, $SiO_2$, cordierite, and combinations thereof.

According to another embodiment of the present invention, provided is a fuel cell system that includes the above reformer, at least one electricity generating element for generating electrical energy by an electrochemical reaction of hydrogen and an oxidant, a fuel supplier for supplying a fuel to the reformer, and an oxidant supplier for supplying an oxidant to the reformer and the electricity generating element.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE EMBODIMENTS

Figure 1:
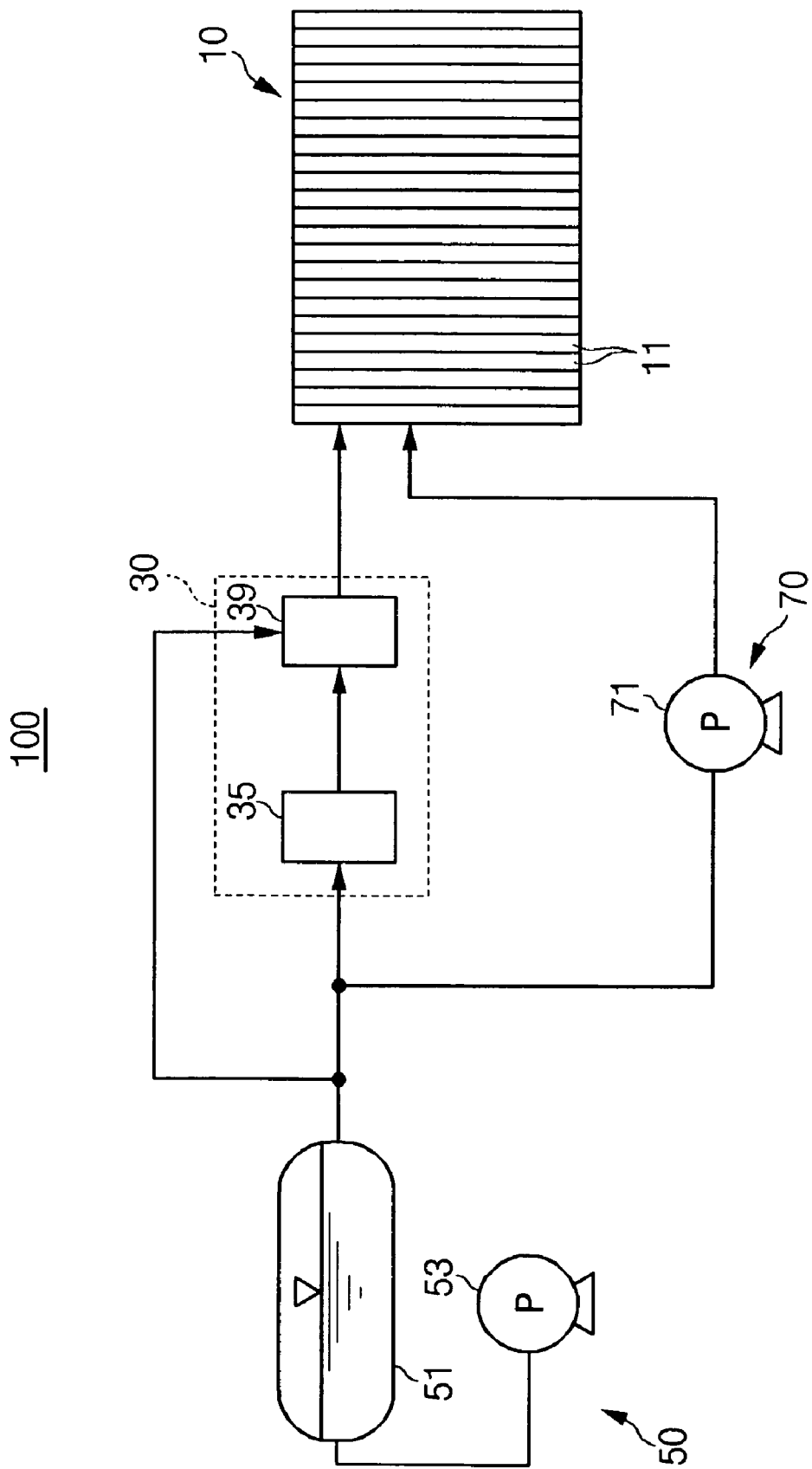
FIG. 1 is a schematic diagram showing the structure of a fuel cell system according to another embodiment of the present invention.

A reformer for a fuel cell system according to one embodiment includes a heating source for generating heat by a reaction of a fuel and an oxidant using an oxidizing catalyst, and a reforming reaction part for generating hydrogen by a reforming catalyst reaction. The oxidizing catalyst includes a solid acid which includes a strong acid ion and an inorganic oxide, and a platinum-based metal.

The strong acid ion lets the inorganic oxide have a strong acid site on the surface thereof. The strong acid ion strongly binds with the inorganic oxide and thereby the surface of the inorganic oxide becomes thermally stable.

The solid acid is stronger than 100% $H_2SO_4$ and is therefore referred to as a solid super acid. It also has both a Lewis acid site and a Bronsted acid site. The solid acid does not cause corrosion of a reactor and can be repeatedly used, and also its product can be easily separated compared to a conventional liquid super acid. Therefore, it does not cause acid waste problems.

When the platinum-based metal is supported on the solid acid, the activity of the platinum-based catalyst can be improved because the solid acid is a super acid and has a relatively large specific surface area (generally over $80m^2/g$).

When the oxidizing catalyst is used for a catalyst for a heating source of a reformer for a fuel cell system, a starting temperature of the reaction of a fuel and an oxidant by the oxidizing catalyst can be reduced. The reaction of a fuel and an oxidant by the oxidizing catalyst is processed as follows: a fuel is adsorbed onto the oxidizing catalyst and then the adsorbed fuel is oxidized. When the oxidizing catalyst is used for a catalyst for a heating source of a reformer for a fuel cell system, the fuel is adsorbed onto the acid site of the solid acid of the oxidizing catalyst. Since the solid acid is a super acid, the fuel adsorbed onto the solid acid has strong polarity. Due to the polarity of the absorbed fuel, the activation energy for oxidizing the fuel can be reduced, and the oxidation reaction of the fuel can be started at a low temperature of 90° C.

The term "platinum-based metal" in the specification and the claims means platinum group metal. The platinum-based metal according to an embodiment of the present invention includes at least one selected from the group consisting of Pt, Pd, Ru, Rh, and combinations thereof. According to one embodiment, Pt may be appropriate.

The inorganic oxide includes an oxide of an element selected from the group consisting of Zr, Al, Ti, Si, Mg, Zn, and combinations thereof. According to one embodiment, Zr oxide may be appropriate for the inorganic oxide.

The strong acid ion includes at least one selected from the group consisting of sulfate ion, phosphate ion, and combinations thereof.

The oxidizing catalyst includes more than 0.5 parts by weight and less than or equal to 50 parts by weight of the platinum-based metal based on 100 parts by weight of the oxidizing catalyst. According to one embodiment, the oxidizing catalyst includes 1 to 5 parts by weight of the platinum-based metal based on 100 parts by weight of the oxidizing catalyst. When the amount of the platinum-based metal is not more than 0.5 parts by weight, the oxidizing catalyst activity is reduced and thus the starting temperature of the fuel oxidation by the oxidizing catalyst cannot be sufficiently decreased. On the contrary, when it is more than 50 parts by weight, the synthesis cost of the oxidizing catalyst becomes high.

The oxidizing catalyst includes 10 to 70 parts by weight of the solid acid based on 100 parts by weight of the oxidizing catalyst. According to one embodiment, the oxidizing catalyst includes 20 to 60 parts by weight of the solid acid based on 100 parts by weight of the oxidizing catalyst. When the amount of the solid acid is less than 10 parts by weight, the solid acid effect is not sufficient, while when it is more than 70 parts by weight, oxidizing catalyst activity may be deteriorated and thus the starting temperature of the fuel oxidation by the oxidizing catalyst cannot be sufficiently decreased.

The oxidizing catalyst may further include a carrier supporting the platinum-based metal and the solid acid. The carrier may be selected from the group consisting of $Al_2O_3$, $TiO_2$, $SiO_2$, $ZrO_2$, MgO, and combinations thereof. According to one embodiment, a granule type of $Al_2O_3$ may be appropriate.

When the oxidizing catalyst further includes the carrier, the oxidizing catalyst includes less than 89.5 parts by weight of the carrier based on 100 parts by weight of an oxidizing catalyst. According to one embodiment, the oxidizing catalyst includes 35 to 80 parts by weight of the carrier based on 100 parts by weight of an oxidizing catalyst. When the amount of the carrier is more than or equal to 89.5 parts by weight, the amount of the solid acid is also decreased resulting in reduction of acid sites, and the amount of Pt is decreased resulting in reduction of oxidizing catalyst activity. Therefore, the starting temperature of the fuel oxidation by the oxidizing catalyst cannot be sufficiently decreased.

Exemplary methods of producing the oxidizing catalyst are described as follows.

The oxidizing catalyst can be synthesized as follows. A strong acid ion is impregnated into an inorganic oxide and the resulting product is fired to prepare a solid acid. A platinum-based metal is impregnated into the solid acid, and the resulting product is fired to prepare an oxidizing catalyst.

For impregnating the strong acid ion into the inorganic oxide, the resulting inorganic oxide and a strong acid ion-containing compound are added to a solvent.

The inorganic oxide includes an oxide of an element selected from the group consisting of Zr, Al, Ti, Si, Mg, Zn, and combinations thereof. The strong acid ion-containing compound includes at least one selected from the group consisting of sulfuric acid, ammonium sulfate, sulfurous acid, ammonium sulfite, thionyl chloride, dimethyl sulfuric acid, phosphoric acid, ammonium phosphate, and combinations thereof. The solvent includes at least one selected from the group consisting of water, ethanol, isopropanol, acetone, methyl ethyl ketone, methyl isobutyl ketone, and combinations thereof.

The firing temperature to prepare the solid acid (i.e., the temperature for firing the strong acid impregnated into the inorganic oxide supported on the carrier) is varied depending on the firing time. According to one embodiment, the temperature may range from 400 to 900° C. According to another embodiment, the temperature may range from 550 to 750° C. When the firing temperature is less than 400° C, calcinations are not completely implemented, while when it is more than 900° C., calcinations may be finished before the firing time is complete, and thus process time and cost may be wasted.

The firing time to prepare the solid acid is varied depending on the firing temperature. According to one embodiment, the firing time may generally range from 1 to 5 hours. According to another embodiment, the firing time may range from 2 to 4 hours. When the firing time is less than 1 hour, calcinations are not completely implemented, while when it is more than 5 hours, calcinations may be finished before the firing time is complete, and thus process time and cost may be wasted.

For impregnating the platinum-based metal into the solid acid, the above prepared solid acid and a platinum-based metal-containing precursor are added to a solvent.

The platinum-based metal-containing precursor is at least one selected from the group consisting of $H_2PtCl_6$, $Pt(C_5H_7O_2)_2$, $H_6Cl_2N_2Pt$, $PtCl_2$, $PtBr_2$, $PdCl_2$, $Pd(C_2H_3O_2)_2$, $Pd(C_5H_7O_2)_2$, $RuCl_3$, $Ru(C_5H_7O_2)_3$, $(NH_4)_2RuCl_6$, $(NH_4)_3RhCl_6$, $[Rh(CH_3COO)_2]_2$, $Rh(H_2O)(NO_3)_3$, hydrates thereof, and combinations thereof. The solvent includes at least one selected from the group consisting of water, ethanol, isopropanol, acetone, methyl ethyl ketone, methyl isobutyl ketone, and combinations thereof.

The firing temperature to prepare the oxidizing catalyst (i.e., the temperature for firing the platinum-based metal impregnated into the solid acid) is varied depending on a firing time. According to one embodiment, the temperature may range from 400 to 900° C. According to another embodiment, the temperature may range from 550 to 750° C. When the firing temperature is less than 400° C., calcinations are not completely implemented, while when it is more than 900° C., calcinations may be finished before the firing time is complete, and thus process time and cost may be wasted and a pore structure of the resulting oxidizing catalyst may be damaged.

The firing time is varied depending on the firing temperature. According to one embodiment, the firing time may generally range from 1 to 5 hours. According to another embodiment, the firing time may range from 2 to 4 hours. When the firing time is less than 1 hour, calcinations are not completely implemented, while when it is more than 5 hours, calcinations may be finished before the firing time is complete, and thus a process time and cost may be wasted and a pore structure of the resulting oxidizing catalyst may be damaged.

In the case when the oxidizing catalyst further includes a carrier supporting the platinum-based metal and a solid acid, the oxidizing catalyst may be prepared as follows. An inorganic oxide precursor and a carrier are mixed and fired to prepare an inorganic oxide supported on the carrier. A strong acid is impregnated into the inorganic oxide supported on the carrier and the resulting product is fired to prepare a solid acid. A platinum-based metal is impregnated into the prepared solid acid and then fired to prepare an oxidizing catalyst which further includes the carrier.

The inorganic oxide precursor may be any one that can be fired to produce an inorganic oxide. Examples of the inorganic oxide precursor include, but are not limited to, at least one selected from the group consisting of nitrate, chlorides, bromides, methoxide, ethoxide, propoxide, butoxide, and combinations thereof, which includes an element selected from the group consisting of Zr, Al, Ti, Si, Mg, Zn, and combinations thereof.

The carrier may be selected from the group consisting of $Al_2O_3$, $TiO_2$, $SiO_2$, $ZrO_2$, MgO, and combinations thereof. According to one embodiment, a granule type of $Al_2O_3$ may be appropriate.

The firing temperature to prepare the inorganic oxide supported on the carrier is varied depending on the firing time. According to one embodiment, the temperature may range from 100 to 500° C. According to another embodiment, the temperature may range from 200 to 400° C. When the firing temperature is less than 100° C., calcinations are not completely implemented, while when it is more than 500° C., calcinations may be finished before the firing time is complete, and thus process time and cost may be wasted.

The firing time to prepare the inorganic oxide supported on the carrier is varied depending on the firing temperature. According to one embodiment, the firing time may generally range from 1 to 5 hours. According to another embodiment, the firing time may range from 2 to 4 hours. When the firing time is less than 1 hour, calcinations are not completely implemented, while when it is more than 5 hours, calcinations may be finished before the firing time is complete, and thus process time and cost may be wasted.

The firing temperatures to prepare the solid acid (i.e., the temperature for firing the strong acid impregnated into the inorganic oxide supported on the carrier) and the oxidizing catalyst (i.e., the temperature for firing the platinum-based metal impregnated into the solid acid) are varied depending on a firing time. According to one embodiment, the temperature may range from 400 to 900° C. According to another embodiment, the temperature may range from 550 to 750° C. When the firing temperature is less than 400° C., calcinations are not completely implemented, while when it is more than 900° C., calcinations may be finished before a firing time is complete, and thus process time and cost may be wasted and a pore structure of the resulting oxidizing catalyst may be damaged.

The firing time is varied depending on the firing temperature. According to one embodiment, the firing time may generally range from 1 to 5 hours. According to another embodiment, the firing time may range from 2 to 4 hours. When the firing time is less than 1 hour, calcinations are not completely implemented, while when it is more than 5 hours, calcinations may be finished before the firing time is complete, and thus process time and cost may be wasted and a pore structure of the resulting oxidizing catalyst may be damaged.

According to another embodiment of the present invention, a reformer for a fuel cell system is provided, which includes a heating source for generating heat by reaction of a fuel and an oxidant using an oxidizing catalyst, and a reforming reaction part for generating hydrogen by a reforming catalyst reaction. The heating source includes a first reacting region that includes a platinum-based catalyst including a solid acid which includes a strong acid ion and an inorganic oxide, and a platinum-based metal, and a second reacting region including a non-platinum-based catalyst.

Since the heating source of a reformer includes a platinum-based catalyst, a fuel oxidizing catalyst reaction starts at a low temperature. In addition, since it includes a platinum-based catalyst in a smaller amount than a conventional heating source, it can decrease a manufacturing cost.

The first and second reacting regions may be sequentially disposed.

The fuel and oxidant may be sequentially supplied to the first reacting region and then to the second reacting region.

The fuel and oxidant are supplied to the first reacting region and undergo a fuel oxidizing catalyst reaction due to a platinum-based catalyst at a low temperature. The fuel oxidizing catalyst reaction in the first reacting region produces heat, which causes a fuel oxidizing catalyst reaction in the second reacting region. Resultantly, the fuel oxidizing catalyst reaction proceeds in the second reacting region including a non-platinum-based catalyst at a low temperature.

The platinum-based catalyst and the non-platinum-based catalyst may be included in a volume ratio of 1:1 to 1:5. In one embodiment, the platinum-based catalyst and the non-platinum-based catalyst may be included in a volume ratio of 1:1 to 1:4. However, in another embodiment, the platinum-based catalyst and the non-platinum-based catalyst may be included in a volume ratio of 1:2 and 1:3. Since the platinum-based catalyst has excellent activity for a fuel oxidizing catalyst reaction but is expensive, it has no particular limit to its amount but should be included in a small amount to decrease cost. The platinum-based catalyst in the first reacting region plays a role of initiating a fuel oxidizing catalyst reaction at a low temperature within the aforementioned volume ratio range.

The strong acid ion, the solid acid, the platinum-based metal, and the inorganic oxide are the same as in the reformer of a fuel cell system according to an embodiment as described above.

The platinum-based catalyst may include more than 0.5 parts by weight and less than or equal to 50 parts by weight of the platinum-based metal and 10 to 70 parts by weight of the solid acid. In one embodiment, the platinum-based catalyst may include the platinum-based metal and the solid acid in a weight ratio of 1 to 5:20 to 60. In another embodiment, the platinum-based catalyst may include the platinum-based metal and solid acid in a weight ratio of 1:10, 1:30, 1:50, 1:70, 10:10, 10:30, 10:50, 10:70, 30:10, 30:30, 30:50, 30:70, 50:10, 50:30, 50:50, or 50:70.

When the weight ratio of the platinum-based metal is less than 0.5, the catalyst may have reduced activity and thereby cannot sufficiently decrease the starting temperature of a fuel oxidizing catalyst, while when it is more than 50, the cost for manufacturing the catalyst may increase.

When the weight ratio of the solid acid is included in an amount of less than 10, a platinum-based catalyst may not have the sufficient effect of the solid acid, while when included in an amount of more than 70, a platinum-based catalyst may have decreased activity and cannot sufficiently decrease the starting temperature of the fuel oxidizing catalyst reaction The platinum-based catalyst may further include a carrier supporting the platinum-based metal and solid acid. The carrier may be selected from the group consisting of $Al_2O_3$, $TiO_2$, $SiO_2$, $ZrO_2$, MgO, and combinations thereof. In one embodiment, a granule type of $Al_2O_3$ may be appropriate for the carrier.

When the platinum-based catalyst may further include a carrier, the carrier may be included in an amount of less than 89.5 parts by weight of the carrier based on 100 parts by weight of a platinum-based catalyst. In one embodiment, the carrier may be included in an amount of 35 to 80 parts by weight based on 100 parts by weight of a platinum-based catalyst. In one embodiment, the carrier may be included in an amount of 80, 70, 60, 50, 40, 30, 20,10, or 1 part by weight based on 100 parts by weight of a platinum-based catalyst. When the carrier is included in an amount of more than or equal to 89.5 parts by weight based on 100 parts by weight of a platinum-based catalyst, the solid acid is less included, decreasing the numbers of acid sites. In addition, a platinum-based metal is less included, resultantly decreasing the platinum-based catalyst activity and thereby not sufficiently lowering the starting temperature of the fuel oxidizing catalyst.

For the non-platinum-based catalyst, any fuel oxidizing catalyst for a heating source without a platinum-based metal can be used. The non-platinum-based catalyst may include a metal oxide including $CeO_2$, MO (wherein M is a transition element), and CuO.

The metal oxide including $CeO_2$, MO, and CuO stores an oxidant. In other words, the metal oxide supplies an oxidant during the oxidizing catalyst reaction of a fuel. Since the metal oxide abundantly includes an oxidant, it can speed up the reaction rate of the fuel and oxidant and cause a fuel oxidizing catalyst reaction at a low temperature.

The non-platinum-based catalyst may include 10 to 30 parts by weight of $CeO_2$ based on the weight of the non-platinum-based catalyst. In one embodiment, the non-platinum-based catalyst may include 15 to 25 parts by weight of $CeO_2$ based on the weight of the non-platinum-based catalyst.

In another embodiment, the non-platinum-based catalyst may include 10, 15, 20, 25, or 30 parts by weight of $CeO_2$ based on the weight of the non-platinum-based catalyst.

When the $CeO_2$ is included in an amount of less than 10 parts by weight, an oxidant may have too low a diffusion concentration. On the other hand, when it is included in an amount of 30 parts by weight, the non-platinum-based catalyst may have sharply deteriorated pore structure and thermal stability.

The non-platinum-based catalyst may include 0.1 to 5 parts by weight of MO based on the weight of the non-platinumbased catalyst. In one embodiment, it may include 3.5 to 4.5 parts by weight of $CeO_2$ based on the weight of the non-platinum-based catalyst.

In another embodiment, the MO may be included in an amount of 0.1, 0.5, 1, 2, 3, 4, or 5 parts by weight. When the MO is included in an amount of less than 0.1 parts by weight, the MO may have little effect. On the contrary, when it is included in an amount of more than 5 parts by weight, a non-platinum-based catalyst may have rather deteriorated activity.

The M of the MO is a transition element selected from the group consisting of Ni, Co, Fe, and combinations thereof.

In one embodiment, the non-platinum-based catalyst includes 1 to 10 parts by weight of CuO, but in another embodiment, it includes 2.5 to 5 parts by weight of CuO. In another embodiment, the CuO may be included in an amount of 1, 2, 3, 4, 5, 6, 7, 8, 9, or 10 parts by weight. When the CuO is included in an amount of less than 1 part by weight, the non-platinum-based catalyst may have too low oxygen storage capability, while when the CuO is included in an amount of more than 10 parts by weight, it may have deteriorated activity.

The metal oxide including $CeO_2$, MO, and CuO may be supported on a carrier selected from the group consisting of $Al_2O_3$, $TiO_2$, $SiO_2$, cordierite, and combinations thereof. In one embodiment, $Al_2O_3$ is appropriate for the carrier for supporting the metal oxide.

The non-platinum-based catalyst may include 55 to 88.9 parts by weight of the carrier based on the weight of the non-platinum-based catalyst. In one embodiment, the carrier may be included in an amount of 55, 60, 65, 70, 75, 80, 85, or 88.9 parts by weight. When the amount of the carrier is less than 55 parts by weight, the mechanical strength of the non-platinum-based catalyst is not sufficient and its porosity becomes smaller, while when it is more than 88.9 parts by weight, the relative amount of the metal oxide lessens resulting in activity decrease of the non-platinum-based catalyst.

In addition, the metal oxide may be a solid solution of $CeO_2$, MO, and CuO. When the metal oxide is a solid solution, the $CeO_2$, MO, and CuO are uniformly dispersed at a molecular level. Therefore, the metal oxide can improve capability of storing an oxidant, and resultantly, supply more oxidant to a fuel.

The non-platinum-based catalyst including the $CeO_2$, MO (wherein M is a transition element), and CuO may further include $ZrO_2$. The $ZrO_2$ improves stability of the non-platinum-based catalyst at a high temperature. The $ZrO_2$ helps a surface active material melted into the catalyst at a high temperature of 800° C. or more, and thus prevents collapse of active sites of the catalyst.

When the non-platinum-based catalyst further includes $ZrO_2$, the non-platinum-based catalyst includes 5 to 20 parts by weight of $ZrO_2$, 5 to 20 parts by weight of $CeO_2$, 0.1 to 5 parts by weight of MO, and 1 to 10 parts by weight of CuO.

In another embodiment, the $ZrO_2$ may be included in an amount of 5, 10, 15, or 20 parts by weight. When the amount of $ZrO_2$ is less than 5 parts by weight, the non-platinum-based catalyst may not have sufficient stability improvement at a high temperature, while when it is more than 20 parts by weight, the non-platinum-based catalyst may have deteriorated activity.

According to another embodiment of the present invention, provided is a fuel cell system that includes the above reformer, at least one electricity generating element for generating electrical energy by an electrochemical reaction of hydrogen and an oxidant, a fuel supplier for supplying a fuel to the reformer, and an oxidant supplier for supplying an oxidant to the reformer and the electricity generating element.

An embodiment of the present invention will hereinafter be described in detail with reference to the accompanying drawings. However, the present invention may have various modifications and equivalent arrangements and it is to be understood that the invention is not limited to the described embodiments.

Figure 2:
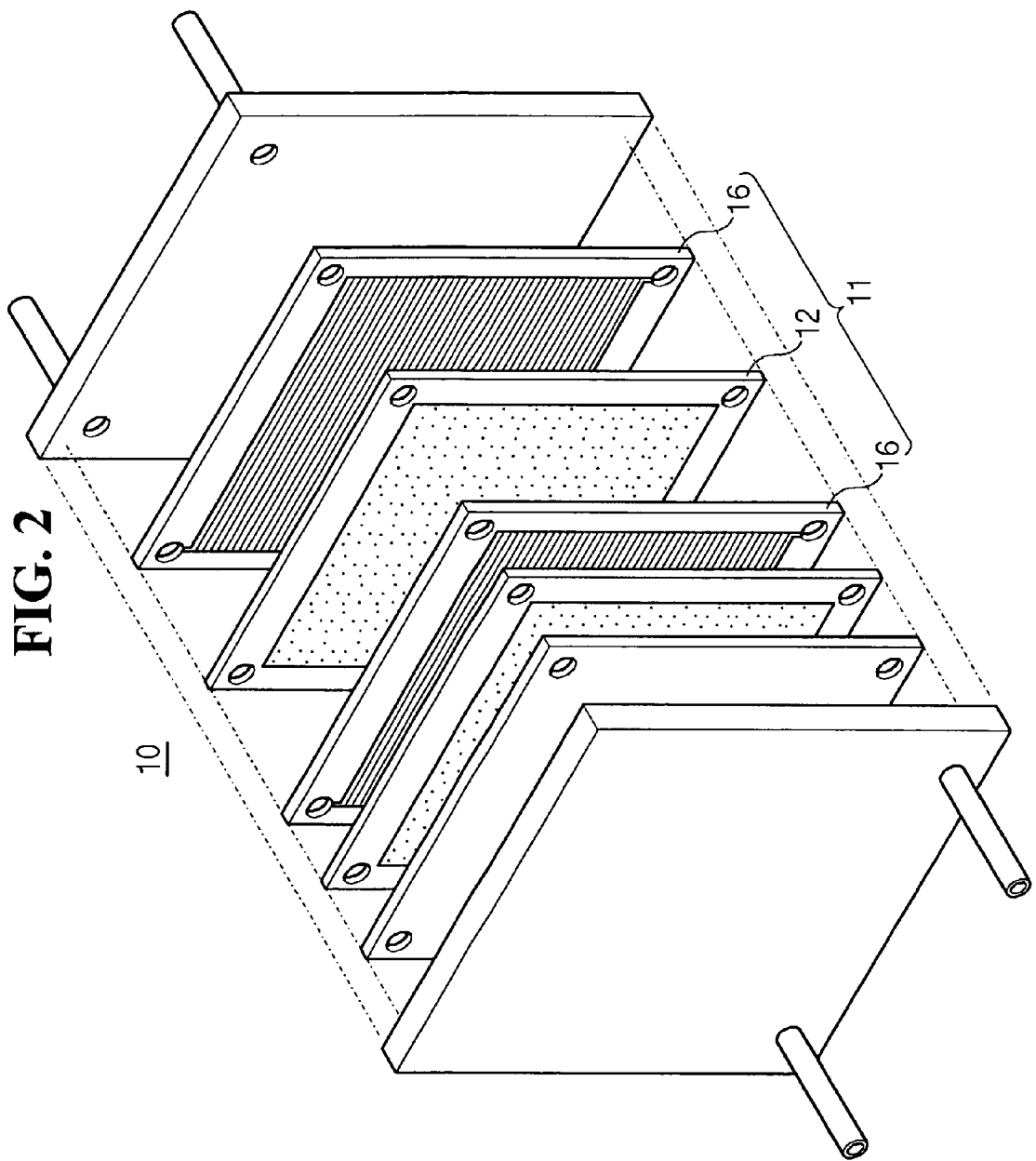
FIG. 2 is an exploded perspective view showing a stack structure for the fuel cell system illustrated in FIG. 1.

FIG. 1 is a schematic view showing the whole structure of a fuel cell system according to one embodiment of the present invention, and FIG. 2 is an exploded perspective view showing the stack structure illustrated in FIG. 1.

Referring to the drawings, a fuel cell system 100 is a polymer electrolyte membrane fuel cell (PEMFC) where a hydrogen-containing fuel is reformed to generate hydrogen, and then electrical energy is generated by an electrochemical reaction of the hydrogen and an oxidant.

In the fuel cell system 100, the oxidant includes a gas that reacts with hydrogen, for example oxygen or air containing oxygen stored in a separate storing space.

The fuel cell system 100 includes electricity generating elements 11 that generate electrical energy through an electrochemical reaction of a reformed gas supplied from a reformer 30 and an oxidant, a fuel supplier 50 for supplying a fuel to the reformer 30, the reformer 30 that generates hydrogen from a fuel and supplies the hydrogen to the electricity generating element 11, and an oxidant supplier 70 for supplying the oxidant to the reformer 30 and the electricity generating elements 11. The electricity generating elements 11 are stacked to form a stack 10.

Such a fuel cell system 100 can be a power source for supplying a predetermined electrical energy to any load such as a portable electronic device, including a laptop computer and a PDA, or a mobile telecommunication device.

The reformer 30 generates hydrogen from the hydrogen-included fuel by a chemical catalyst reaction, for example a steam reforming reaction, a partial oxidation, or an autothermal reaction, and supplies the generated hydrogen to the stack 10. The reformer 30 is connected with the stack 10 and the fuel supplier 50 via a pipe line and so on.

The reformer 30 includes the heating source 35 generating the predetermined heat required for the reforming catalyst reaction of the fuel by the oxidation catalyst reaction between the fuel and the oxidant respectively supplied from the fuel supplier 50 and the oxidant supplier 70, and a reforming reaction part 39 absorbing the heat generated from the heating source 35 to generate hydrogen from the fuel via the reforming catalyst reaction of the fuel supplied from the fuel supplier 50. The reformer further includes a carbon monoxide reducing part where carbon monoxide is optionally oxidized.

The heating source 35 of the reformer 30 and the reforming reaction part 39 may be independently equipped and connected to each other via a common connection element. Alternatively, they may be incorporated in a double pipeline where the heating source 35 is disposed inside and the reforming reaction part 39 is disposed outside.

The heating source 35 generates heat through a reaction of a fuel and an oxidant by an oxidizing catalyst that includes a solid acid which includes a strong acid ion and an inorganic oxide, and a platinum-based metal.

The reforming reaction part 39 includes a reactor body, and a reforming catalyst in the reactor body. The reactor body can be made in various shapes. According to one embodiment, a container-type reactor body having a predetermined inside space may be appropriate.

The reforming catalyst promotes a reforming reaction of a fuel by absorbing heat from the heating source 35 and includes at least one catalyst selected from the group consisting of nickel (Ni), platinum (Pt), ruthenium (Ru), silver (Au), palladium (Pd), copper (Cu), zinc (Zn), a copper-zinc alloy (Cu—Zn), and combinations thereof, that is supported on a carrier selected from the group consisting of alumina ($Al_2O_3$), silica ($SiO_2$), titania ($TiO_2$), and combinations thereof in a pellet shape.

When the reactor body is composed of a reaction substrate, the reforming catalyst is in a channel of the reaction substrate. Alternatively, when the reactor body is composed of a container, a pellet or honey-comb type reforming catalyst is filled inside the reactor body.

The fuel supplier 50 for supplying the fuel to the reformer 30 includes a fuel tank 51 containing the fuel to be supplied to the reformer 30 and a fuel pump 53 connecting with the fuel tank 51 and supplying the fuel from the fuel tank 51. The fuel tank 51 is connected with the heating source 35 of the reformer 30 and the reforming reaction part 39 via pipe lines.

The oxidant supplier 70 includes an air pump 71 inhaling an oxidant with a predetermined pumping force, and supplying the oxidant to the electricity generating elements 11 of the stack 10 and the heating source 35. According to the present embodiment shown in the drawing, the oxidant supplier 70 is illustrated to supply the oxidant to the stack 10 and the heating source 35 via a single air pump 71, but it is not limited thereto. It may include a pair of oxidant pumps mounted to the stack 10 and the heating source 35 respectively.

Upon driving the system 100 according to one embodiment of the present invention, hydrogen generated from the reformer 30 is supplied to the electricity generating elements 11 and the oxidant is supplied to the electricity generating elements 11, and thereby the electrochemical reaction occurs by the oxidation reaction of the hydrogen and the reduction reaction of the oxidant to generate electrical energy having a predetermined power output, as well as water and heat.

Furthermore, the fuel cell system 100 may include a common control unit (not shown) mounted separately that substantially controls the overall operation of the system, for example, operations of the fuel supplier 50 and the oxidant supplier 70.

As shown in FIG. 2, the stack 10 is composed of stacked electricity generating elements 11. Each electricity generating element 11 includes a membrane-electrode assembly (MEA) 12 and separators (or bipolar plates) 16 disposed at both sides of the MEA to constitute a fuel cell as a minimum unit.

The membrane-electrode assembly 12 includes an anode and a cathode respectively having active areas for the electrochemical reaction of hydrogen and an oxidant, and an electrolyte membrane interposed between the anode and the cathode.

At the anode, hydrogen is oxidized to produce protons and electrons, and at the cathode, the protons react with an oxidant to generate heat and moisture. The electrolyte membrane functions as an ion exchanger for transferring the protons generated at the anode to the cathode. The separators 16 supply a fuel and an oxidant to the membrane-electrode assemblies 12, and also work as conductors for serially coupling the anodes and the cathodes in the membrane-electrode assemblies 12.

As such a stack 10 may be provided as in a stack of a general polymer electrolyte type fuel cell, a detailed description thereof is omitted from this specification.

The following examples illustrate the present invention in more detail. However, it is understood that the present invention is not limited by these examples.

Preparation of an Oxidizing Catalyst

EXAMPLE 1

33.03 g of $ZrO(NO_3)_2 \cdot 6H_2O$ and 20 g of a granule type of $Al_2O_3$ were added to 300 ml of water, and the resulting product was fired at 300° C. for 1 hour to prepare $ZrO_2$ supported on $Al_2O_3$. 0.981 g of $H_2SO_4$ was added to 30 ml of water to prepare an impregnation solution. The solution was impregnated into 25g of $ZrO_2$ supported on $Al_2O_3$, and the product was fired at 650° C. for 3 hours to prepare solid acid $ZrO_2$—$SO_4^{2-}$ supported on $Al_2O_3$.

3 g of $H_2PtCl_6 \cdot 6H_2O$ was added to 10 ml of water to prepare a Pt Precursor solution. 2 ml of the Pt precursor solution was added to 18 ml of water to prepare an impregnation solution. The impregnation solution was impregnated into the 25 g of $ZrO_2$—$SO_4^{2-}$, and then the resulting product was fired at 650° C. for 1.5 hours to prepare an oxidizing catalyst. The oxidizing catalyst included $ZrO_2$—$SO_4^{2-}$ and Pt, with $Al_2O_3$ supporting the Pt and $ZrO_2$—$SO_4^{2-}$. The oxidizing catalyst included 1 part by weight of Pt, 60 parts by weight of the solid acid, and 39 parts by weight of $Al_2O_3$ based on 100 parts by weight of the oxidizing catalyst.

EXAMPLE 2

The oxidizing catalyst was prepared according to the same method as in Example 1, except that the oxidizing catalyst included 1 part by weight of Pt, 40 parts by weight of the solid acid, and 59 parts by weight of $Al_2O_3$ based on 100 parts by weight of the oxidizing catalyst.

EXAMPLE 3

The oxidizing catalyst was prepared according to the same method as in Example 1, except that the oxidizing catalyst included 1 part by weight of Pt, 20 parts by weight of the solid acid, and 79 parts by weight of $Al_2O_3$ based on 100 parts by weight of the oxidizing catalyst.

EXAMPLE 4

The oxidizing catalyst was prepared according to the same method as in Example 1, except that the oxidizing catalyst included 2 parts by weight of Pt, 60 parts by weight of the solid acid, and 38 parts by weight of $Al_2O_3$ based on 100 parts by weight of the oxidizing catalyst.

EXAMPLE 5

The oxidizing catalyst was prepared according to the same method as in Example 1, except that the oxidizing catalyst included 2 parts by weight of Pt, 40 parts by weight of the solid acid, and 58 parts by weight of $Al_2O_3$ based on 100 parts by weight of the oxidizing catalyst.

EXAMPLE 6

The oxidizing catalyst was prepared according to the same method as in Example 1, except that the oxidizing catalyst included 2 parts by weight of Pt, 20 parts by weight of the solid acid, and 78 parts by weight of $Al_2O_3$ based on 100 parts by weight of the oxidizing catalyst.

EXAMPLE 7

The oxidizing catalyst was prepared according to the same method as in Example 1, except that the oxidizing catalyst included 3 parts by weight of Pt, 60 parts by weight of the solid acid, and 37 parts by weight of $Al_2O_3$ based on 100 parts by weight of the oxidizing catalyst.

EXAMPLE 8

The oxidizing catalyst was prepared according to the same method as in Example 1, except that the oxidizing catalyst included 3 parts by weight of Pt, 40 parts by weight of the solid acid, and 57 parts by weight of $Al_2O_3$ based on 100 parts by weight of the oxidizing catalyst.

EXAMPLE 9

The oxidizing catalyst was prepared according to the same method as in Example 1, except that the oxidizing catalyst included 3 parts by weight of Pt, 20 parts by weight of the solid acid, and 77 parts by weight of $Al_2O_3$ based on 100 parts by weight of the oxidizing catalyst.

EXAMPLE 10

The oxidizing catalyst was prepared according to the same method as in Example 1, except that the oxidizing catalyst included 4 parts by weight of Pt, 60 parts by weight of the solid acid, and 36 parts by weight of $Al_2O_3$ based on 100 parts by weight of the oxidizing catalyst.

EXAMPLE 11

The oxidizing catalyst was prepared according to the same method as in Example 1, except that the oxidizing catalyst included 4 parts by weight of Pt, 40 parts by weight of the solid acid, and 56 parts by weight of $Al_2O_3$ based on 100 parts by weight of the oxidizing catalyst.

EXAMPLE 12

The oxidizing catalyst was prepared according to the same method as in Example 1, except that the oxidizing catalyst included 4 parts by weight of Pt, 20 parts by weight of the solid acid, and 76 parts by weight of $Al_2O_3$ based on 100 parts by weight of the oxidizing catalyst.

EXAMPLE 13

The oxidizing catalyst was prepared according to the same method as in Example 1, except that the oxidizing catalyst included 5 parts by weight of Pt, 60 parts by weight of the solid acid, and 35 parts by weight of $Al_2O_3$ based on 100 parts by weight of the oxidizing catalyst.

EXAMPLE 14

The oxidizing catalyst was prepared according to the same method as in Example 1, except that the oxidizing catalyst included 5 parts by weight of Pt, 40 parts by weight of the solid acid, and 55 parts by weight of $Al_2O_3$ based on 100 parts by weight of the oxidizing catalyst.

EXAMPLE 15

11.019 g of $ZrO(NO_3)_2 \cdot 6H_2O$ and 20 g of $Al_2O_3$ were added to 100 ml of water, and the resulting product was fired at 300° C. for 1 hour to prepare $ZrO_2$ supported on $Al_2O_3$. 0.981 g of $H_2SO_4$ was added to 30 ml of water to prepare a solution. The solution was impregnated into 20 g of $ZrO_2$ supported on $Al_2O_3$, and the product was fired at 650° C. for 3 hours to prepare solid acid $ZrO_2$—$SO_4^{2-}$.

3 g of $H_2PtCl_6 \cdot 6H_2O$ was added to 10 ml of water to prepare a Pt precursor solution. 2.5 ml of the Pt precursor solution was added to 0.5 ml of water to prepare an impregnation solution. The impregnation solution was impregnated into the 6 g of $ZrO_2$—$SO_4^{2-}$ and then the resulting product was fired at 650° C. for 1.5 hours to prepare an oxidizing catalyst. The oxidizing catalyst included $ZrO_2$—$SO_4^{2-}$ and Pt, with $Al_2O_3$ supporting the Pt and $ZrO_2$—$SO_4^{2-}$. The oxidizing catalyst included 5 parts by weight of Pt, 20 parts by weight of the solid acid, and 75 parts by weight of $Al_2O_3$ based on 100 parts by weight of the oxidizing catalyst.

Preparation of a Heating Source and Measurement of a Reaction Starting Temperature Two tube reactors were fabricated and one reactor was charged with 9 ml of the oxidizing catalyst prepared from Example 1 and the other reactor was charged with 8 ml of the oxidizing catalyst prepared from Example 15 to provide a heating source for a reformer. Fuels, including 35 volume % of isobutane, 50 volume % of n-butane, and 15 volume % of $C_3H_8$, were supplied to each heating source at 279.1 ml/min and air was supplied at 2000 ml/min. Further, the heating source was maintained to have an inside temperature at 90° C. by a heater.

Figure 3:
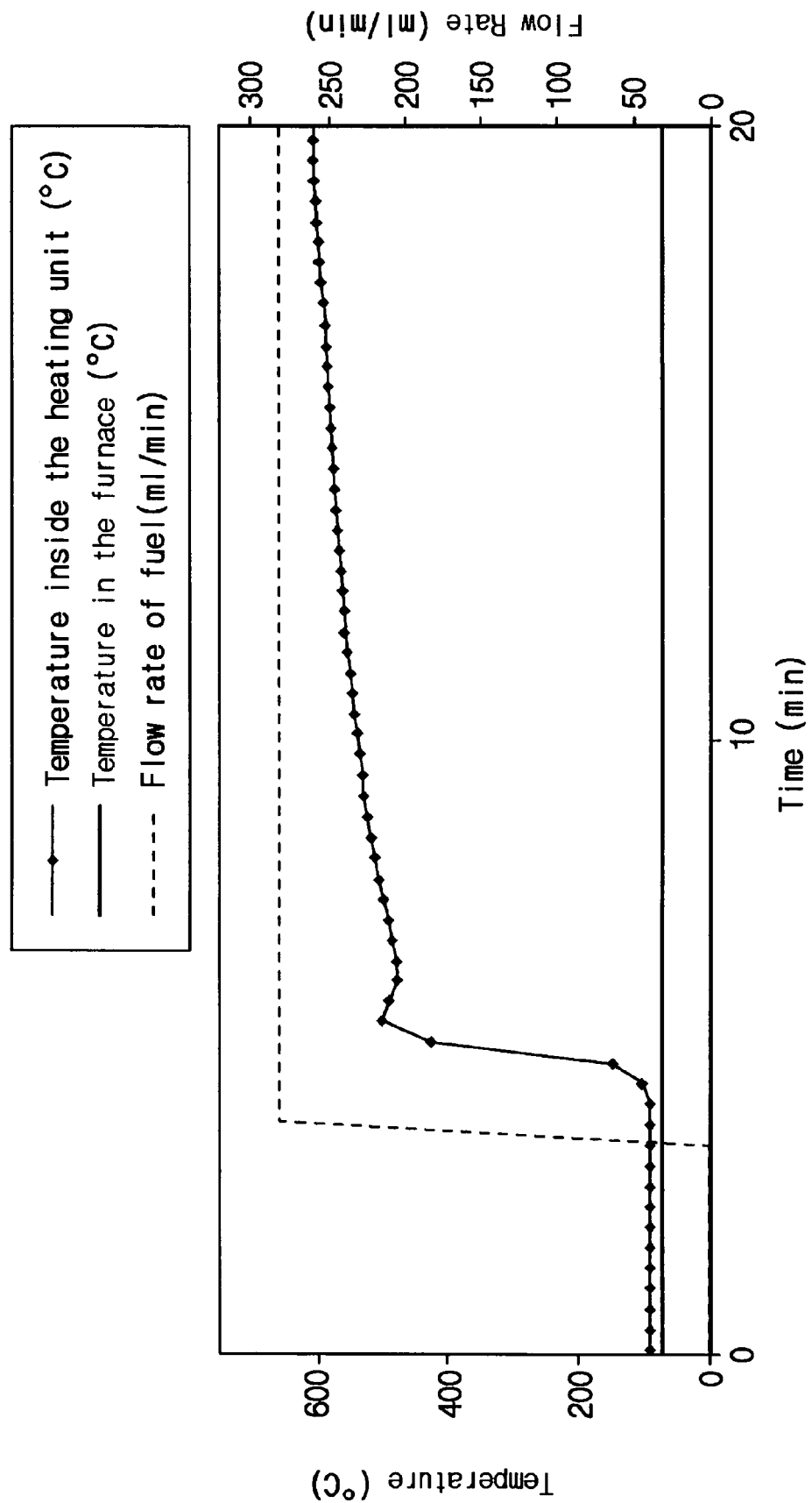
FIG. 3 is a graph showing temperature changes inside the heating source including the oxidizing catalyst according to Example 1.
Figure 4:
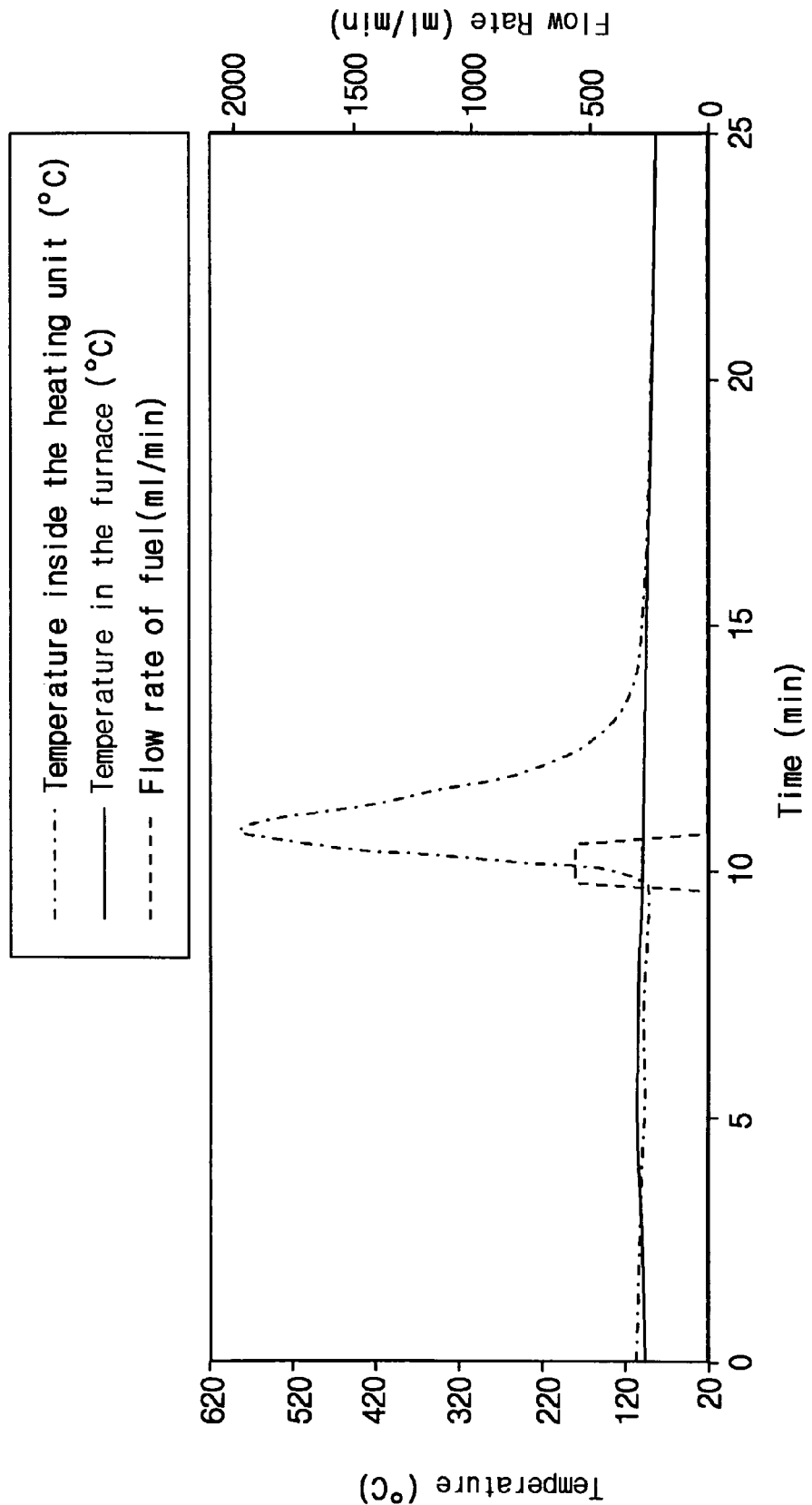
FIG. 4 is a graph showing temperature changes inside the heating source including the oxidizing catalyst according to Example 15.

The inside temperature of each heating source was monitored. The results of the heating source charged with the oxidizing catalyst according to Example 1 are shown in FIG. 3, and the results of the heating source charged with the oxidizing catalyst according to Example 15 are shown in FIG. 4. As shown in FIG. 3 and FIG. 4, it was confirmed that the oxidizing catalyst reaction was started even with the inside temperature of the heating source at 90° C.

This test was repeated with the oxidizing catalysts prepared from Examples 2 to 14, and it was confirmed that the oxidizing catalyst reaction was started even at 90° C.

COMPARATIVE EXAMPLES 1 TO 15

Comparative Examples 1 to 8 included oxidizing catalysts disclosed in Törncrona's papers (Low temperature catalytic activity of cobalt oxide and ceria promoted Pt and Pd: Influence of pretreatment and gas composition, applied Catalysis B: Environmental, Volume 14, Issues 1-2, 5 Dec. 1997, Pages 131-145, A. Törncrona et al., which is incorporated herein by reference). The temperatures for starting the oxidation reaction of the oxidizing catalysts and the fuel are shown in Table 1.

The oxidizing catalyst of Comparative Example 9 is the catalyst disclosed in U.S. Pat. No. 5,345,011, which is incorporated herein by reference. The starting temperature of the oxidation reaction of the fuel by the oxidizing catalyst is shown in Table 1.

The oxidizing catalysts of Comparative Examples 10 to 13 are the catalysts disclosed in U.S. Pat. No. 5,139,994, which is incorporated herein by reference. The starting temperatures of the oxidation reaction of the fuel by the oxidizing catalysts are shown in Table 1.

The oxidizing catalyst of Comparative Example 14 is the catalyst disclosed in U.S. Pat. No. 6,187,709, which is incorporated herein by reference. The starting temperature of the oxidation reaction of the fuel by the oxidizing catalyst is shown in Table 1.

The oxidizing catalyst of Comparative Example 15 is the catalyst disclosed in U.S. Pat. No. 6,086,835, which is incorporated herein by reference. The starting temperature of the oxidation reaction of the fuel by the oxidizing catalyst is shown in Table 1.

TABLE 1

| | Oxidizing catalyst | Fuel | Reaction starting temperature (° C.) | |
|---|---|---|---|---|
| Comp. Ex. 1 | 1 wt % Pt/Al$_2$O$_3$ | propane | 300 | Monolith carrier |
| Comp. Ex. 2 | 0.5 wt % Pd/Al$_2$O$_3$ | propane | 245 | Monolith carrier |
| Comp. Ex. 3 | 1 wt % Pt/20 wt % CeO$_2$/Al$_2$O$_3$ | propane | 247 | Monolith carrier |
| Comp. Ex. 4 | 0.5 wt % Pd/20 wt % CeO$_2$/Al$_2$O$_3$ | propane | 256 | Monolith carrier |
| Comp. Ex. 5 | 1 wt % Pt/20 wt % Co$_2$O$_3$/Al$_2$O$_3$ | propane | 237 | Monolith carrier |
| Comp. Ex. 6 | 0.5 wt % Pd/20 wt % Co$_2$O$_3$/Al$_2$O$_3$ | propane | 246 | Monolith carrier |
| Comp. Ex. 7 | 20 wt % CeO$_2$/Al$_2$O$_3$ | propane | 237 | Monolith carrier |
| Comp. Ex. 8 | 20 wt % Co$_2$O$_3$/Al$_2$O$_3$ | propane | 364 | Monolith carrier |
| Comp. Ex. 9 | 13 wt % Mn supported on crystalline aluminophosphate structural framework | methane | 200 to 450 | Space velocity 200 to 2000 h$^{-1}$ |
| Comp. Ex. 10 | platinum/alumina catalyst | propane | 262 | — |
| Comp. Ex. 11 | TiO$_2$/Pt/Al$_2$O$_3$ | propane | 297 | — |
| Comp. Ex. 12 | platinum/alumina catalyst | ethane | 523 | Fuel including 20 volume % of SO$_2$ |
| Comp. Ex. 13 | TiO$_2$/Pt/Al$_2$O$_3$ | ethane | 500 | Fuel including 20 volume % of SO$_2$ |
| Comp. Ex. 14 | palladium-based catalyst | | 450 | — |
| Comp. Ex. 15 | 0.5 wt % gold, 9.5 wt % cobalt, 80 wt % zirconium oxide/cerium oxide and 10 wt % titanium dioxide | | 300 | Space velocity 60000 h$^{-1}$ |

As shown by Table 1, Examples 1 to 15 showed a lower starting temperature of the oxidizing catalyst reaction than that of Comparative Examples 1 to 15.

Preparation of Oxidizing Catalyst

EXAMPLE 16

Preparation of a Platinum-Based Catalyst 33.03 g of ZrO(NO$_3$)$_2$.6H$_2$O and 20 g of Al$_2$O$_3$ were added to 300 ml of water. The prepared product was fired at 300° C. for 1 hour, preparing ZrO$_2$ supported on Al$_2$O$_3$. Then, 0.981 g of H$_2$SO$_4$ was added to 30 ml of water, preparing an impregnation solution, and 25 g of the ZrO$_2$ supported on Al$_2$O$_3$ was impregnated therewith. The resulting product was fired at 650° C. for 3 hours, preparing solid acid ZrO$_2$—SO$_4^{2-}$.

3 g of H$_2$PtCl$_6$.6H$_2$O was added to 10 ml of water, preparing a Pt precursor solution. 2 ml of the prepared Pt precursor solution was added to 18 ml of water, preparing an impregnation solution. 25 g of the ZrO$_2$—SO$_4^{2-}$ was impregnated with the impregnation solution. The resulting product was fired at 650° C. for 1.5 hours, preparing an oxidizing catalyst. The oxidizing catalyst included ZrO$_2$—SO$_4^{2-}$ and Pt, and Al$_2$O$_3$ supporting them. The oxidizing catalyst included 1 part by weight of Pt, 60 parts by weight of solid acid, and 39 parts by weight of Al$_2$O$_3$.

EXAMPLE 17

Prepartion of a Non-Platinum-Based Catalyst 162.34 g of Cu(NO$_3$)$_2$.3H$_2$O was dissolved in 500 ml of water. Next, 10.60 g of Ce(NO$_3$)$_3$.6H$_2$O and 4.124 g of Ni(NO$_3$)$_2$.6H$_2$O were dissolved in 7.4 ml of the prepared Cu aqueous solution, preparing a mixed solution. Then, 14.84 g of Al$_2$O$_3$ was added to the mixed solution. The resulting solution including Al$_2$O$_3$ was stirred and heated at 100° C. to evaporate water, preparing 190.068 g of a metal oxide. The metal oxide was calcinated at 500° C. for 1 hour.

The prepared fuel oxidizing catalyst included 20 parts by weight of CeO$_2$, 4 parts by weight of NiO, 4 parts by weight of CuO, and 72 parts by weight of Al$_2$O$_3$.

Preparation of a Heating Source and Its Performance Measurement

REFERENCE EXAMPLE 1

Stainless steal tube reactors (GMS 1000®, Sunyoung Sys-Tech Company) was charged with 23 ml of the fuel oxidizing catalyst according to Example 16 to fabricate a heating source.

Fuels, including 35 volume % of isobutane, 50 volume % of n-butane, and 15 volume % of C$_3$H$_8$, were supplied to the heating source, so that butane might be supplied at 1,160 ml/min, and air was supplied at 10,000 ml/min. A space velocity was set to be 26,932 h$^{-1}$.

Figure 5:
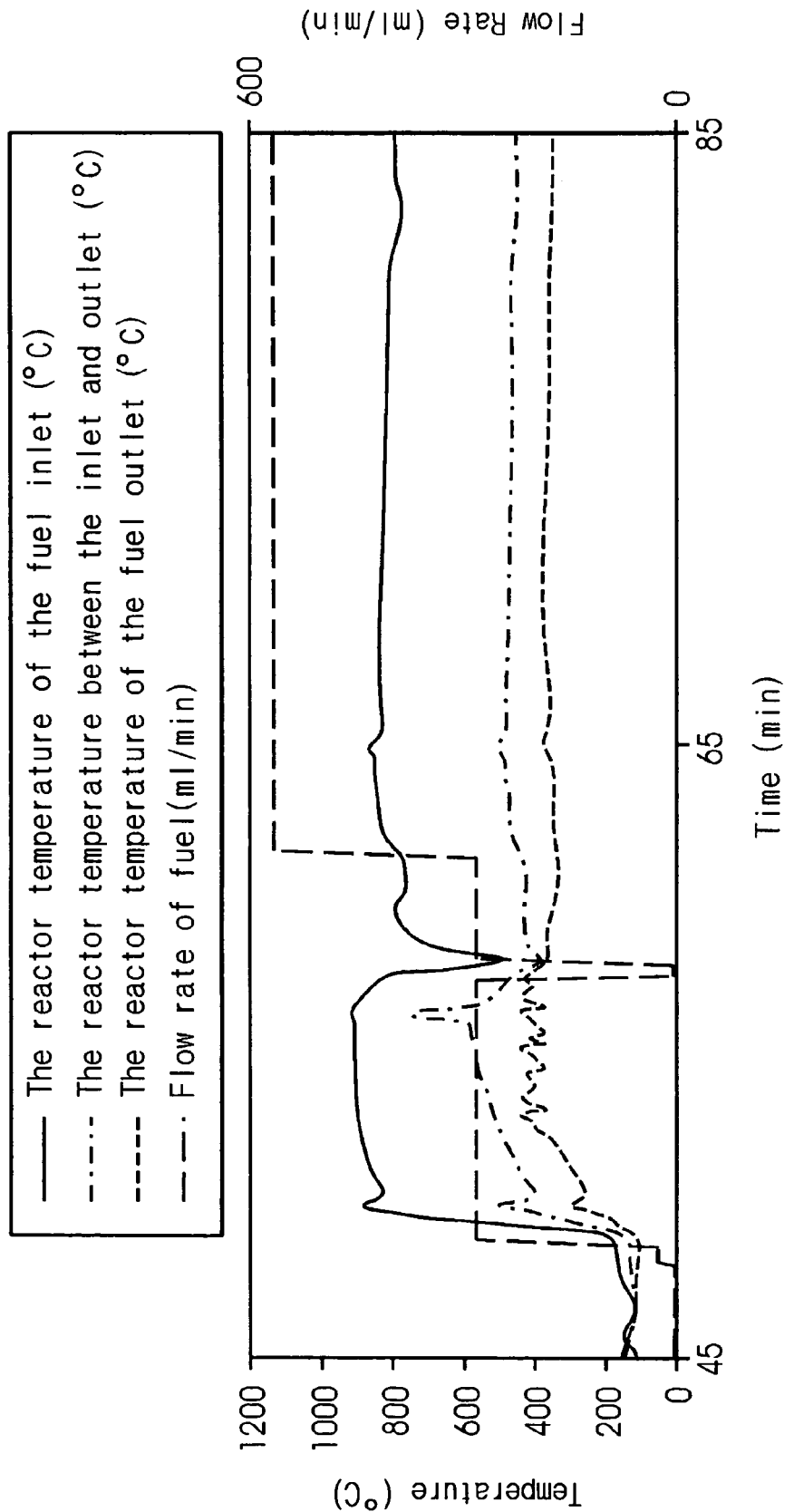
FIG. 5 is a graph showing temperature changes inside the heating source according to Reference Example 1.

The reactor temperatures of the fuel inlet, the fuel outlet, and the center between the inlet and outlet were measured by using three thermocouples. The measurement results are shown in FIG. 5.

EXAMPLE 18

A heating source was prepared according to the same method as in Reference Example 1, except for charging 5 ml of the non-platinum-based catalyst according to Example 17 at the fuel inlet portion of the reactor, and the other portion of the reactor is charged with the fuel oxidizing catalyst according to Example 16.

Fuels, including 35 volume % of isobutane, 50 volume % of n-butane, and 15 volume % of $C_3H_8$, were supplied to the heating source, so that butane might be supplied at 1160 ml/min, and air was supplied at 10,000 ml/min. A space velocity was set to be 123,885 $h^{-1}$.

Figure 6:
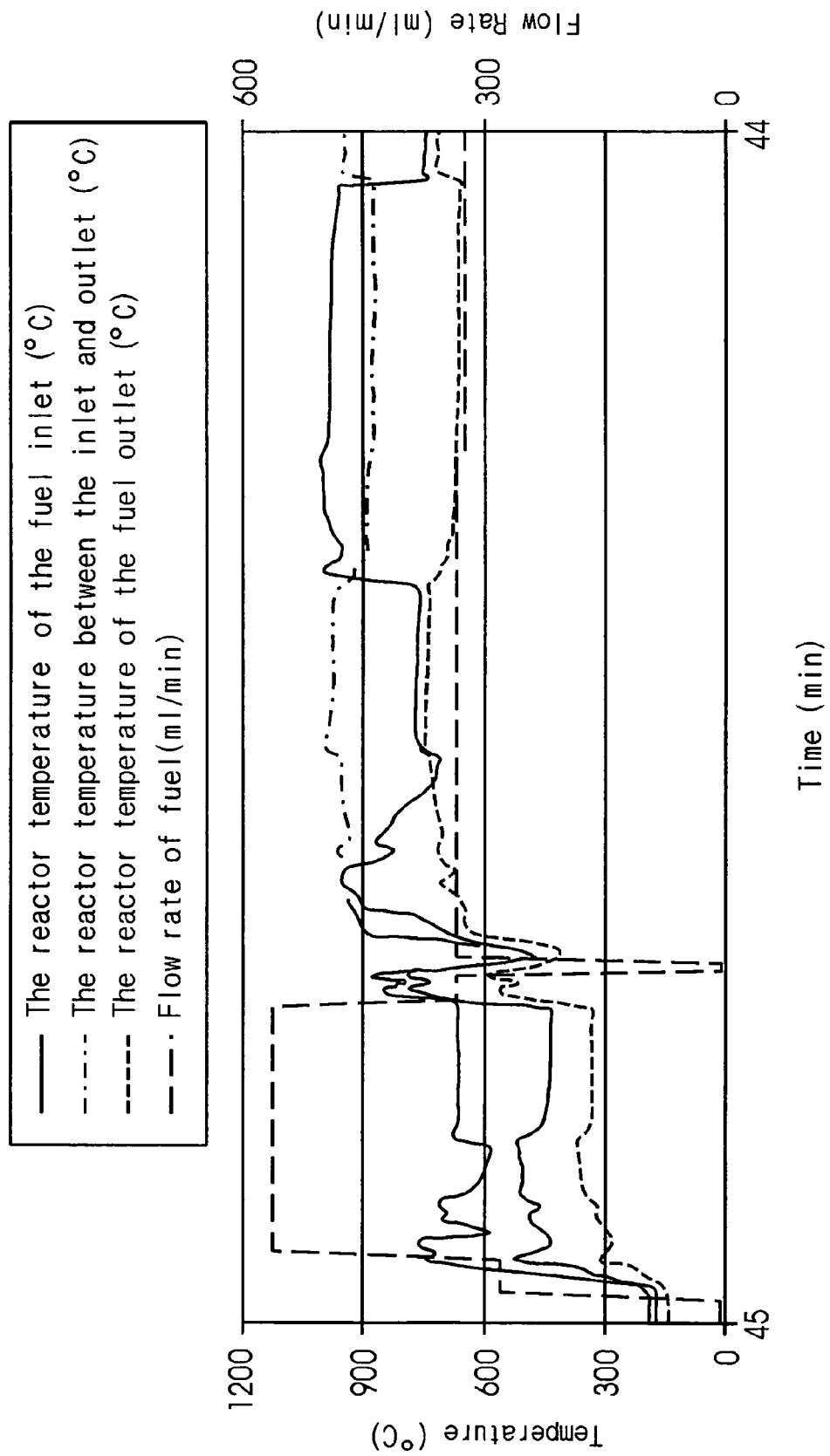
FIG. 6 is a graph showing temperature changes inside the heating source according to Example 17.

The reactor temperatures of the fuel inlet, the fuel outlet, and the center between the inlet and outlet were measured by using three thermocouples. The measurement results are shown in FIG. 6.

EXAMPLE 19

A heating source was prepared according to the same method as in Reference Example 1, except for charging the fuel inlet portion of the reactor with 5 ml of the fuel oxidizing catalyst according to Example 16 and the other part of the reactor was charged with 18 ml of the fuel non-platinum-based catalyst according to Example 17.

Fuels, including 35 volume % of isobutane, 50 volume % of n-butane, and 15 volume % of $C_3H_8$, were supplied to the heating source, so that butane might be supplied at 1160 ml/min, and air was supplied at 10,000 ml/min. A space velocity was set to be 26,932 $h^{-1}$.

Figure 7:
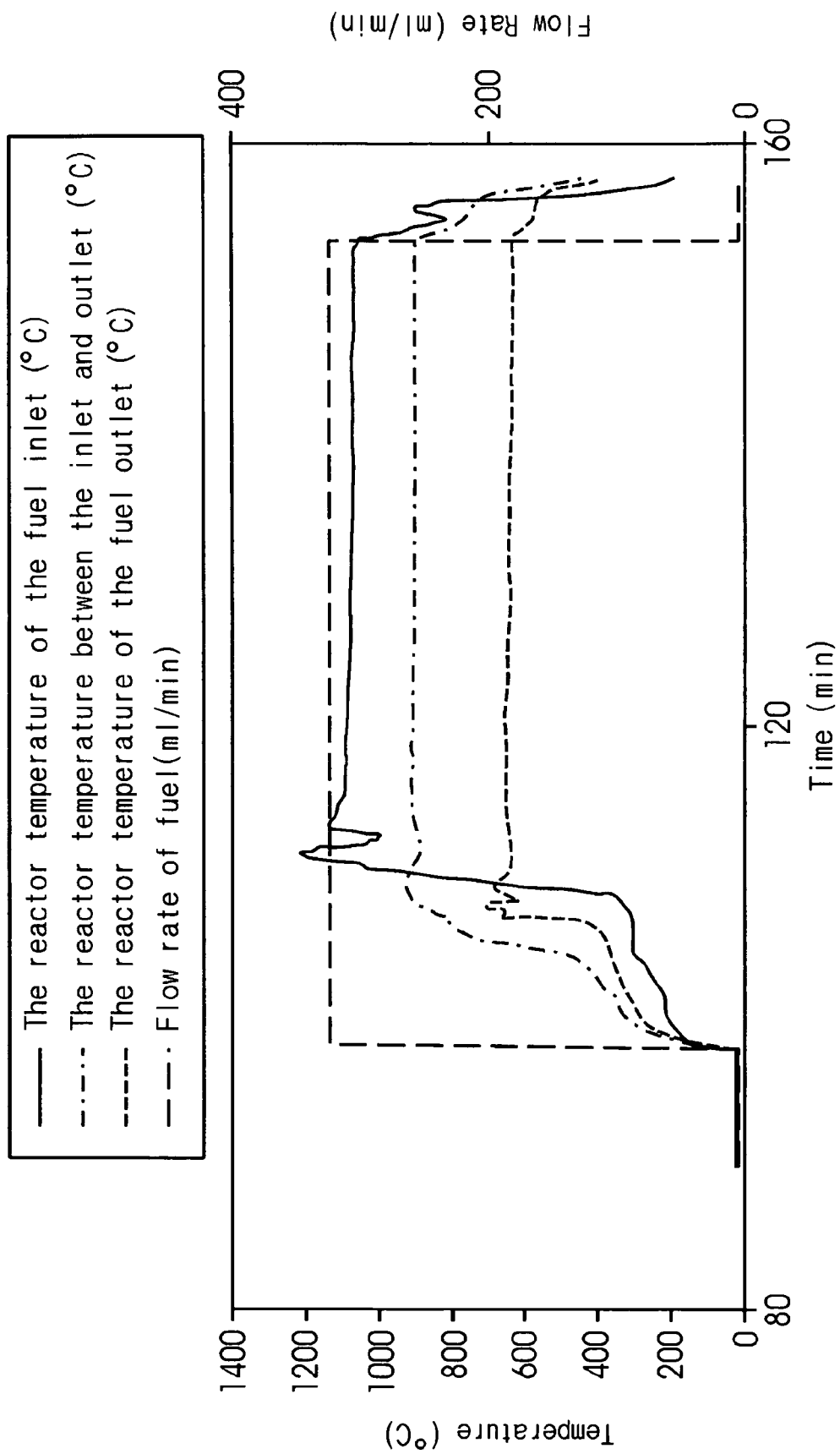
FIG. 7 is a graph showing temperature changes inside the heating source according to Example 18.

The reactor temperatures of the fuel inlet, fuel outlet, and center between the inlet and outlet were measured by using three thermocouples. The measurement results are shown in FIG. 7.

Referring to FIG. 5, when a heating source was fully charged with a platinum-based catalyst, a fuel oxidizing catalyst reaction was found to be stable despite a space velocity of 26,396 h−1.

Referring to FIG. 6, a heating source was partly charged with a platinum-based catalyst, and a main fuel oxidizing catalyst reaction was found to occur at two different areas which show the higher temperatures in a reactor. In other words, a fuel oxidizing catalyst reaction occurred around the inlet of a reactor charged with a platinum-based metal in the beginning, but proceeded to the middle of the reactor and around the outlet not charged with a catalyst as time passed.

Accordingly, a platinum-based catalyst turned out to lower an initiative temperature even when it was partly charged at the side of the inlet of the reactor.

Referring to FIG. 7, a fuel oxidizing catalyst started reacting at a low temperature and stably proceeded as time passes. Accordingly, even a small amount of a platinum-based catalyst in the reactor can start a reaction at a low temperature. Even when the remaining amount of the platinum-based catalyst can be replaced with a non-platinum-based catalyst, the platinum-based catalyst can stabilize a fuel oxidizing catalyst reaction.

The reformer for a fuel cell system can start a fuel oxidation catalyst reaction, and includes a heating source having a simplified structure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A reformer for a fuel cell system, comprising: a heating source for generating heat by a reaction of a fuel and an oxidant using an oxidizing catalyst, the heating source comprising:
   a first reacting region including a platinum-based catalyst comprising a solid acid comprised of an inorganic oxide and a strong acid ion bound to the inorganic oxide, a platinum-based metal supported on the strong acid, and a carrier supporting the solid acid and the platinum-based metal, wherein the non-platinum-based catalyst comprises metal oxide including $CeO_2$, MO wherein M is a transition element, and CuO; and
   a second reacting region including a non-platinum-based catalyst; and
   a reforming reaction part for generating hydrogen by a reforming catalyst reaction.

2. The reformer of claim 1, wherein the platinum-based catalyst and the non-platinum-based catalyst are included in a volume ratio of 1:1 to 1:5.

3. The reformer of claim 1, wherein the carrier is selected from the group consisting of $Al_2O_3$, $TiO_2$, $SiO_2$, $ZrO_2$, MgO, and combinations thereof.

4. The reformer of claim 3, wherein the carrier is included in an amount of less than 89.5 parts by weight of the carrier based on 100 parts by weight of the platinum-based catalyst.

5. The reformer of claim 1, wherein the M is selected from the group consisting of Ni, Co, Fe, and combinations thereof.

6. The reformer of claim 1, wherein the non-platinum-based catalyst includes 10 to 30 parts by weight of $CeO_2$, 0.1 to 5 parts by weight of MO, and 1 to 10 parts by weight of CuO, and less than or equal to 88.9 parts by weight of a carrier supporting the non-platinum-based catalyst, based on 100 parts by weight of the platinum-based catalyst.

7. The reformer of claim 1, wherein the non-platinum-based catalyst further comprises $ZrO_2$.

8. The reformer of claim 7, wherein the non-platinum-based catalyst includes 5 to 20 parts by weight of $ZrO_2$, 5 to 20 parts by weight of $CeO_2$, 0.1 to 5 parts by weight of MO, and 1 to 10 parts by weight of CuO.

9. The reformer of claim 1, wherein the non-platinum-based catalyst is supported on a carrier selected from the group consisting of $Al_2O_3$, $TiO_2$, $SiO_2$, cordierite, and combinations thereof.

* * * * *